(12) United States Patent
Hunt

(10) Patent No.: US 11,744,178 B2
(45) Date of Patent: Sep. 5, 2023

(54) HEADER FLOAT SYSTEM FOR USE WITH AN AGRICULTURAL WINDROWER OR COMBINE

(71) Applicant: CNH Industrial America LLC, New Holland, PA (US)

(72) Inventor: Cory Douglas Hunt, Millersville, PA (US)

(73) Assignee: CNH Industrial America LLC, New Holland, PA (US)

( * ) Notice: Subject to any disclaimer, the term of this patent is extended or adjusted under 35 U.S.C. 154(b) by 709 days.

(21) Appl. No.: 16/695,862

(22) Filed: Nov. 26, 2019

(65) Prior Publication Data
US 2021/0153434 A1 May 27, 2021

(51) Int. Cl.
| | | |
|---|---|---|
| *A01D 41/127* | (2006.01) | |
| *A01D 41/06* | (2006.01) | |
| *A01D 47/00* | (2006.01) | |
| *A01D 61/00* | (2006.01) | |
| *A01B 73/00* | (2006.01) | |

(52) U.S. Cl.
CPC ........... *A01D 41/127* (2013.01); *A01D 41/06* (2013.01); *A01D 47/00* (2013.01); *A01D 61/002* (2013.01); *A01B 73/00* (2013.01)

(58) Field of Classification Search
CPC ...... A01D 41/127; A01D 41/06; A01D 47/00; A01D 61/002; A01D 41/141; A10B 73/00
See application file for complete search history.

(56) References Cited

U.S. PATENT DOCUMENTS

| | | | | |
|---|---|---|---|---|
| 3,306,369 A | * | 2/1967 | Brewer | A01B 51/04 172/319 |
| 5,562,167 A | * | 10/1996 | Honey | A01B 73/00 172/385 |
| 7,661,251 B1 | | 2/2010 | Sloan et al. | |
| 7,971,420 B1 | * | 7/2011 | Bollin | A01D 41/145 56/208 |
| 9,668,412 B2 | | 6/2017 | Ritter et al. | |
| 9,775,291 B2 | | 10/2017 | Neudorf | |
| 9,992,924 B2 | | 6/2018 | van Vooren et al. | |
| 10,070,575 B2 | | 9/2018 | Wenger et al. | |

(Continued)

FOREIGN PATENT DOCUMENTS

| | | | | |
|---|---|---|---|---|
| DE | 1482221 A1 | * | 6/1969 | ........... A01D 78/148 |
| DE | 102013111426 A1 | * | 5/2014 | ............. A01B 73/00 |

(Continued)

OTHER PUBLICATIONS

International Search Report and Written Opinion for Application No. PCT/US2020/061231 dated Mar. 2, 2021 (12 pages).

*Primary Examiner* — Arpad F Kovacs
(74) *Attorney, Agent, or Firm* — Peter Zacharias

(57) ABSTRACT

A header for an agricultural vehicle, and an agricultural vehicle having the header. The header includes a center section extending in a lateral direction, a wing section movably connected at a lateral end of the center section and extending in the lateral direction from the center section, a ground support attached to and extending in a downward direction from the wing section, and a resilient support operatively connected to the wing section and the ground support. The resilient support is configured to generate an adjustable predetermined force to bias the ground support in the downward direction.

20 Claims, 3 Drawing Sheets

(56) References Cited

U.S. PATENT DOCUMENTS

| | | | |
|---|---|---|---|
| 10,165,726 B2 | 1/2019 | Lauwers et al. | |
| 10,278,330 B2 | 5/2019 | Silver et al. | |
| 10,321,629 B2 * | 6/2019 | Talbot | A01D 41/148 |
| 10,321,630 B2 * | 6/2019 | Talbot | A01D 41/145 |
| 10,455,764 B2 * | 10/2019 | Noll | A01D 41/14 |
| 10,827,677 B2 * | 11/2020 | Fay, II | A01D 41/141 |
| 11,058,056 B2 * | 7/2021 | Pierson | A01D 41/1274 |
| 11,246,259 B2 * | 2/2022 | Yanke | A01D 34/283 |
| 2010/0281837 A1 * | 11/2010 | Talbot | A01D 41/141 56/10.2 E |
| 2011/0283673 A1 | 11/2011 | Moersch et al. | |
| 2014/0041351 A1 * | 2/2014 | Bollin | A01D 41/141 56/10.2 E |
| 2015/0033692 A1 * | 2/2015 | Schroeder | A01D 34/008 56/10.2 E |
| 2015/0271999 A1 | 10/2015 | Enns et al. | |
| 2016/0183461 A1 * | 6/2016 | Neudorf | A01D 41/145 56/158 |
| 2018/0070531 A1 * | 3/2018 | Long | A01D 41/145 |
| 2018/0303029 A1 | 10/2018 | Wilbert et al. | |
| 2018/0368317 A1 | 12/2018 | Schulze Selting et al. | |
| 2019/0000014 A1 | 1/2019 | Farley et al. | |
| 2019/0029173 A1 | 1/2019 | Noll et al. | |
| 2019/0029175 A1 | 1/2019 | Talbot et al. | |
| 2019/0200523 A1 * | 7/2019 | Fay, II | A01D 41/145 |
| 2019/0327893 A1 * | 10/2019 | Hamilton | A01D 41/141 |
| 2020/0000027 A1 * | 1/2020 | Yanke | A01D 34/661 |
| 2020/0000033 A1 * | 1/2020 | Shearer | A01D 41/141 |
| 2020/0344950 A1 * | 11/2020 | Brimeyer | A01D 41/145 |
| 2020/0352101 A1 * | 11/2020 | Pierson | A01D 41/1274 |

FOREIGN PATENT DOCUMENTS

| | | | | |
|---|---|---|---|---|
| DE | 102020204861 A1 | * | 10/2020 | A01D 34/04 |
| EP | 1269825 A1 | * | 1/2003 | A01D 41/12 |
| EP | 2387870 A1 | | 11/2011 | |
| EP | 2420126 A1 | * | 2/2012 | A01D 41/141 |
| EP | 2695511 A1 | | 2/2014 | |
| EP | 2832206 A1 | | 2/2015 | |
| EP | 3440919 A1 | | 2/2019 | |
| WO | WO-2020154644 A1 | * | 7/2020 | A01D 41/144 |

* cited by examiner

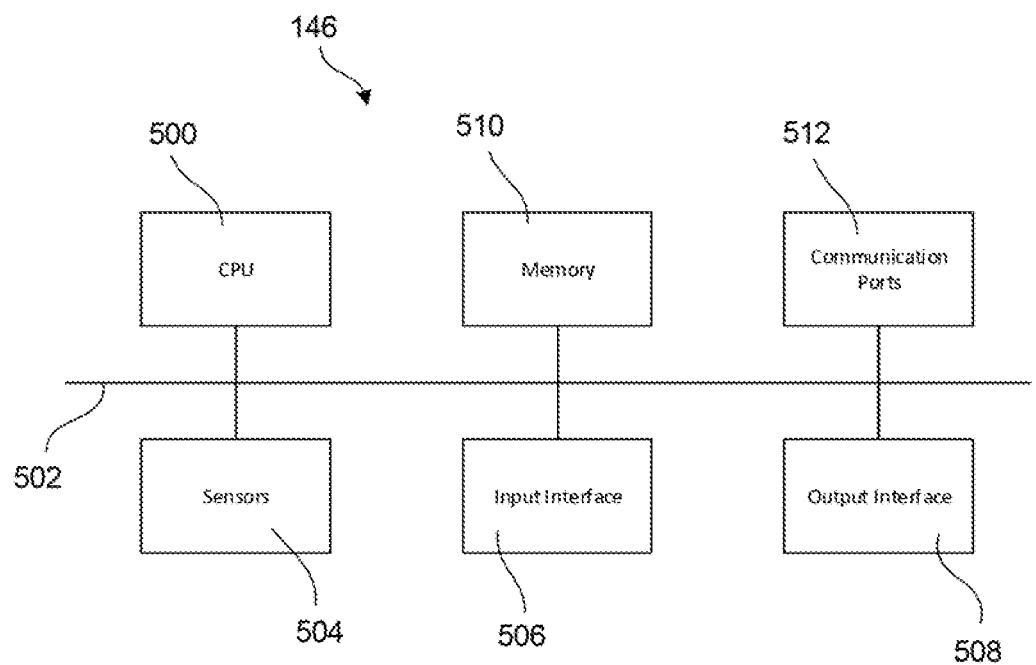
FIG. 5
FIG. 6
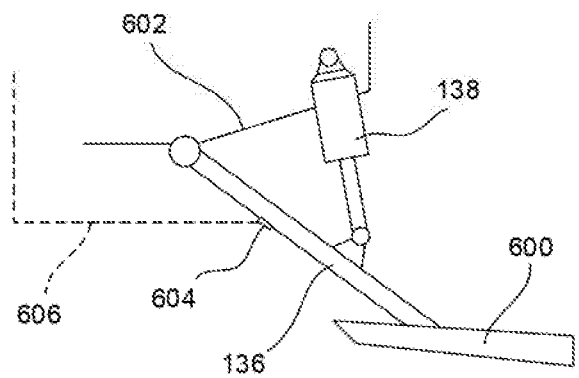
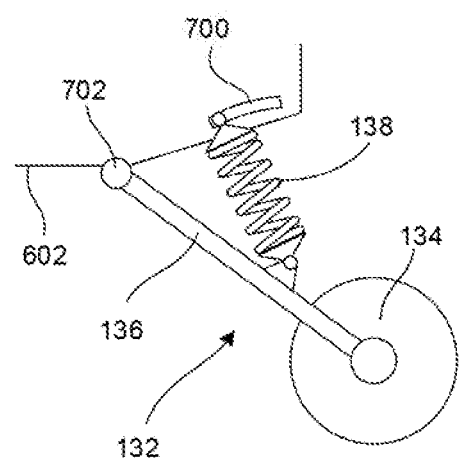
FIG. 7

HEADER FLOAT SYSTEM FOR USE WITH AN AGRICULTURAL WINDROWER OR COMBINE

BACKGROUND OF THE INVENTION

Agricultural combines are machines that gather crop materials and separate the desirable crop (grain, seeds, etc.) from the discardable material (straw, tailings, etc.). To do so, the combine typically collects all of the crop materials using a system including a header and a feeder. The header gathers a wide swath of crop material from the ground, and moves it towards the feeder. The feeder conveys the consolidated crop materials to the threshing and separating system, which separates the desirable crop from the remaining material.

The width of the combine header determines how much crop is collected during each pass of the combine through a field. In some cases, it is desirable to increase the width of the header to improve harvesting efficiency in terms of the number of passes required to completely harvest a given area. However, wider headers can be less effective at following the ground contours than a narrow header, and this can lead to less efficient harvesting of low-growing crops or crops planted on particularly uneven terrain.

To address the problem of undulating terrain, headers have been made with articulated sections. For example, U.S. Pat. Pub. No. 2019/0000014 discloses a combine draper head having a center section and a pivotable "wing" located on each side of the center section. As another example, U.S. Pat. No. 9,992,924 discloses a combine having an articulated header that can be moved to different positions to improve harvesting and also provide a more compact profile during transport. U.S. Pat. Nos. 10,070,575 and 10,165,726 also show combines having headers with pivoting elements.

A potential problem with articulated headers is the possibility that the wings will contact the ground. To prevent such contact, the wings might be supported on gauge wheels or skids (or comparable supports), that extend between each wing and the ground. In other cases, the wings might be supported by a control mechanism, such as one or more single-acting or double-acting hydraulic pistons, to actively control the position of the wing. For example, U.S. Pat. No. 9,668,412 shows an articulated header having wings that are each connected to the center section by a respective pivot and a respective hydraulic piston. Operation of the piston causes the wing to rotate about the pivot to change its angular position relative to the center section and its orientation relative to the ground.

All of the foregoing references and all other references noted in this disclosure are incorporated by reference into this disclosure.

This description of the background is provided to assist with an understanding of the following explanations of exemplary embodiments, and is not an admission that any or all of this background information is necessarily prior art.

SUMMARY OF THE INVENTION

In one exemplary embodiment, there is provided a header for an agricultural vehicle. The header has a center section extending in a lateral direction, a wing section movably connected at a lateral end of the center section and extending in the lateral direction from the center section, a ground support attached to and extending in a downward direction from the wing section, and a resilient support operatively connected to the wing section and the ground support and configured to generate an adjustable predetermined force to bias the ground support in the downward direction.

In some examples of the first aspect, the ground support comprises a gauge wheel.

In some examples of the first aspect, the ground support comprises a skid.

In some examples of the first aspect, the resilient support comprises a spring.

In some examples of the first aspect, the spring has an adjustable effective spring rate.

In some examples of the first aspect, the resilient support comprises a hydraulic or pneumatic actuator.

In some examples of the first aspect, a controller is operatively connected to the hydraulic or pneumatic actuator and configured to maintain a pressure within the hydraulic or pneumatic actuator corresponding to the adjustable predetermined force.

In another exemplary aspect, there is provided an agricultural vehicle having a chassis, a feeder housing having a proximal end movably mounted on the chassis and a distal end located in a forward direction from the proximal end, and a header mounted on the distal end of the feeder housing. The header may be in accordance with the first exemplary aspect and examples described above.

BRIEF DESCRIPTION OF THE DRAWINGS

Embodiments of inventions will now be described, strictly by way of example, with reference to the accompanying drawings, in which:

FIG. 5 is a schematic view of a control system.

FIG. 6 is a schematic side view of a wing section ground support and resilient support.

FIG. 7 is a schematic side view of another wing section ground support and resilient support.

In the figures, like reference numerals refer to the same or similar elements.

DETAILED DESCRIPTION OF THE DRAWINGS

Figure 1:
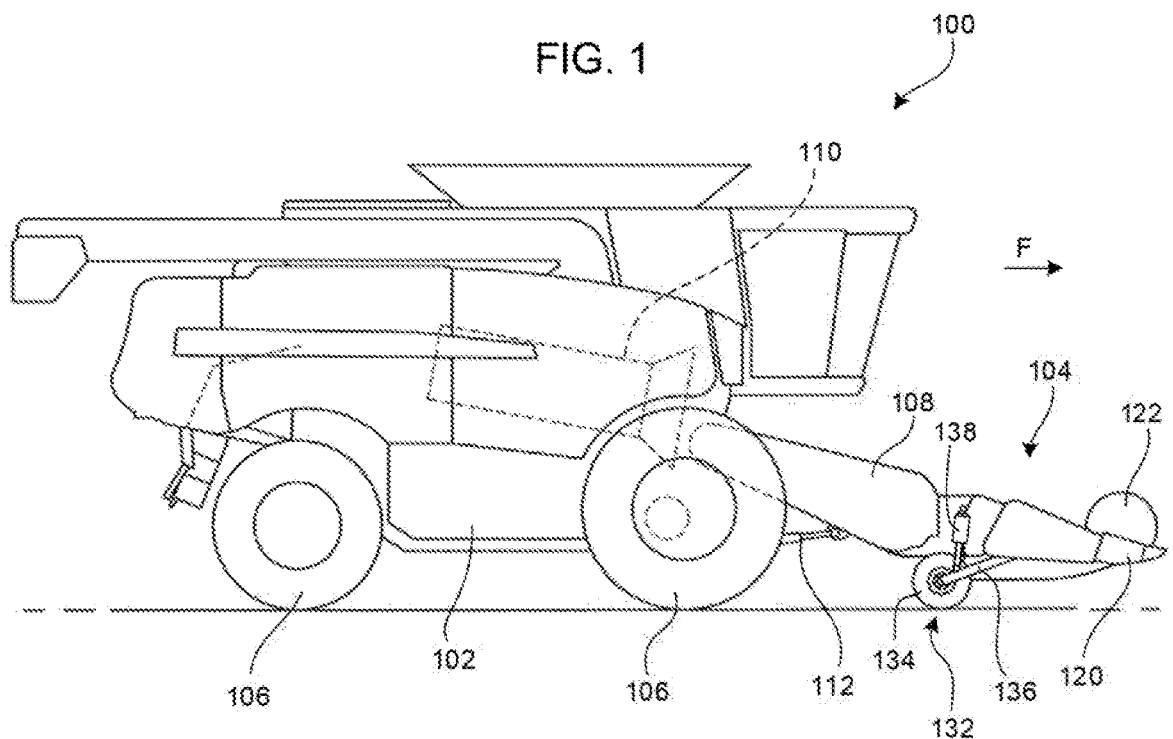
FIG. 1 is a side view of an example of an agricultural vehicle having a header.

The drawing figures depict one or more implementations in accordance with the present concepts, by way of example only, not by way of limitations. The examples are shown in conjunction with an agricultural combine harvester, but have applicability in any similar agricultural vehicle, such as a windrower.

Figure 2:
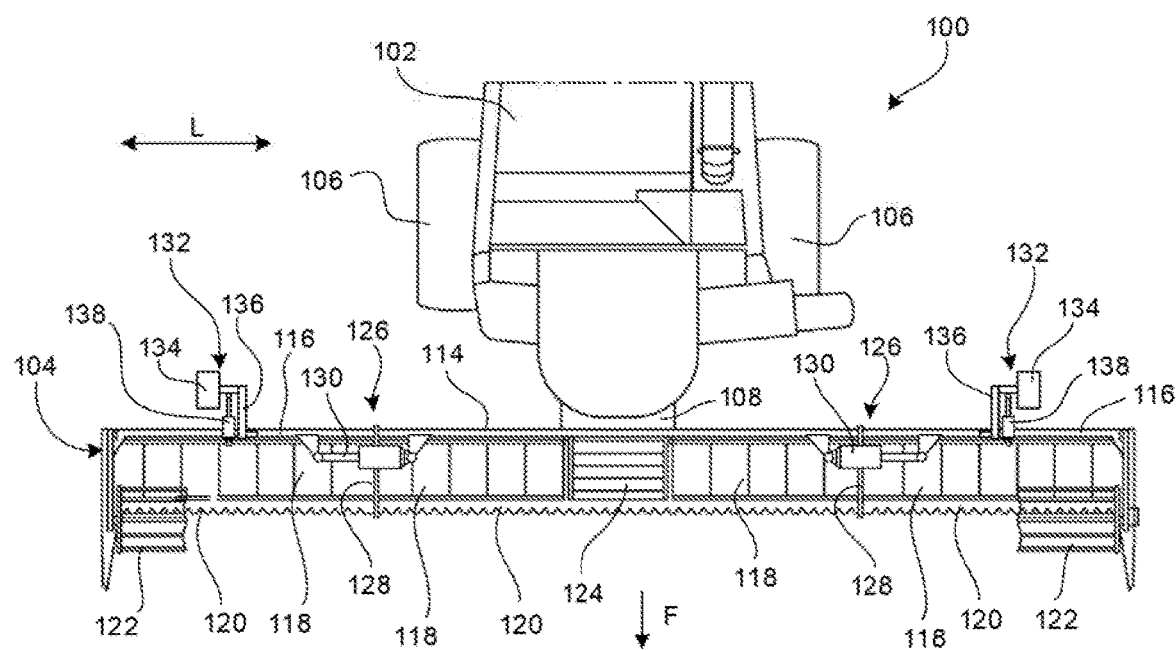
FIG. 2 is a partial top view of the agricultural vehicle of FIG. 1.
Figure 3:
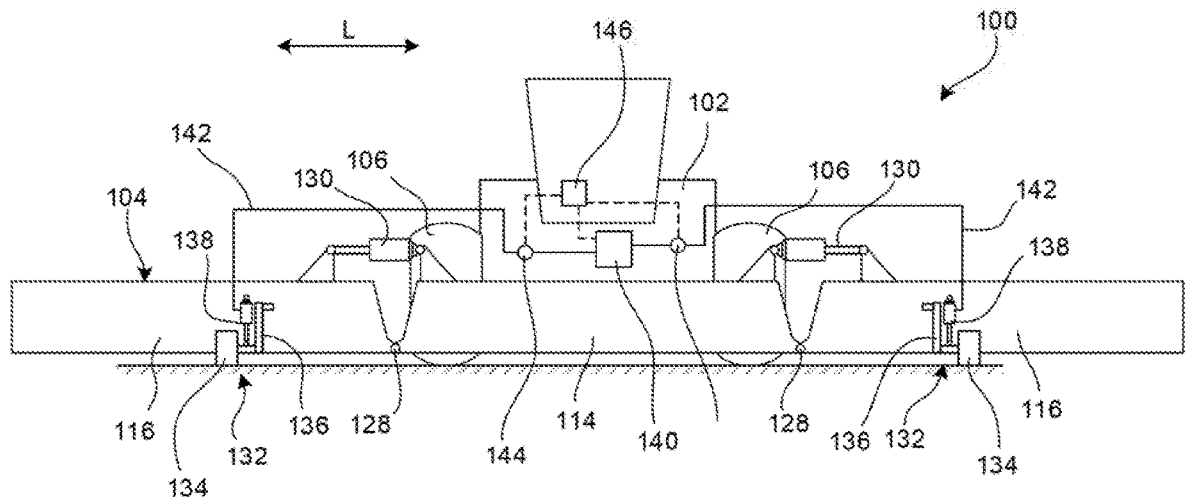
FIG. 3 is a schematic front view of the agricultural vehicle of FIG. 1.

Referring now to FIGS. 1-3, there is shown an exemplary embodiment of an agricultural vehicle 100 in the form of a combine harvester which generally includes a chassis 102 and a header 104 carried by the chassis 102. The chassis 102 is supported on driving wheels 106 (e.g., tracked wheels or pneumatic tires), as known in the art. The vehicle 100 is configured to move in a forward direction, illustrated as arrow F, during harvesting operations.

The header 104 is connected to the chassis 102 by a feeder housing 108, which includes a conveyor configured to collect crop material and direct it to a threshing and separating system 110 inside the vehicle 100, such as known in the art. It should also be appreciated that the header 104 described and illustrated herein does not necessarily need to be included on a combine harvester, but can be incorporated in other agricultural vehicles such as mowers. The feeder housing 108 may be a simple rigid connection or an articulated connection comprising one or more linkage arms and/or feeder housing actuators 112 (e.g., hydraulic pistons/cylinder actuators) that operate as housing position control mechanisms, as known in the art.

The header 104 includes a center section 114, which is mounted to the feeder housing 108, and extends in a lateral direction L that is transverse to the forward direction F. One or more wing sections 116 are attached to the lateral ends of the center section 114, to extend further in the lateral direction L. The center section 114 and wing sections 116 may include any suitable operating mechanisms, such as mowers, seeders, tilling mechanisms, and so on.

In the shown embodiment, the center section 114 and wing sections 116 comprise a so-called draper head, in which each section 114, 116 includes a respective conveyor system 118, cutting system 120, and reel 122 (the reel 122 is partially omitted in FIG. 2 to show underlying parts more clearly). The conveyor systems 118 on the wing sections 116 are configured to move crop material towards the center section 114 (and thus to the feeder housing 108). The center section 114 has two conveyor systems 118 that move crop material received from the wing section 116 towards the feeder housing 108. At the middle of the center section 114, there is a feeder conveyor 124 that collects the crop material from the conveyor systems 118 and directs it into the vehicle 100 for further processing. The conveyor systems 118 may comprise conveyor belts, augers, or the like. The cutting system 120 is provided to cut crop material from the ground, and the reel 122 is rotated (clockwise in FIG. 1) to lift and move the crop material towards the conveyor systems 118. The general details and features of the conveyor systems 118, cutting systems 120 and reels 122 will be understood by persons of ordinary skill in the art, and need not be described herein in detail.

The wing sections 116 are movably connected to the center section 114 by respective articulated joints 126. The articulated joints 126 allow the wing sections 116 to move, relative to the center section 114, between a lowered position and a raised position. The lowered position refers to the position of the wing section 116 when it is relatively close to the ground, and the raised position refers to the position of the wing section 116 when it is relatively far from the ground. The precise range of travel may depend on operating requirements or other factors, but it is preferred that the wing sections 116 be movable upwards and downwards relative to a normal operating position that would be used on level ground. For example, a pivoting wing section 116 might be movable between a downward angle (e.g., 5 degrees downward as measured relative to a plane perpendicular to the gravitational direction) at the lowermost lowered position, and an upward angle (e.g., 30 degrees upwards as measured relative to a plane perpendicular to the gravitational direction) at the highest raised position. The range of motion for wing sections 116 that slide or translate without a corresponding pivoting motion may be specified as linear travel in the downward and upward direction (e.g., 10 inches downward from the normal position in the gravitational direction, and 30 inches upwards from the normal position in the gravitational direction).

Any type of articulated joints 126 may be used to provide relative movement between the wing sections 116 and the center section 114. For example, the articulated joints 126 may comprise pivot connectors 128 (i.e., hinges) that are oriented with one or more pivot axes extending parallel to the forward direction F (see, e.g., U.S. Pat. Pub. No. 2019/0000014). The articulated joints 126 also may allow pivoting movement relative to the center section 114 about multiple axes of rotation (see, e.g., U.S. Pat. Pub. No. 2018/0303029). The articulated joints 126 also may comprise linkages to allow relative translational movement without corresponding relative angular movement, or angular movement about a virtual pivot axis (see, e.g., U.S. Pat. Nos. 9,992,924 and 10,070,575).

The articulated joints 126 also include respective control mechanisms, such as an actuator 130, to control the position of the wing section 116 relative to the center section 114 and feeder housing 108. The actuators 130 may comprise any suitable movable linkage mechanism for moving the wing sections 116. In FIGS. 2 and 3, the actuators 130 are shown as pressurized actuators, such as pneumatic or hydraulic piston and cylinder assemblies that are operated by valves and a source of pressurized fluid (gas, oil, etc.). In this case, the piston/cylinder assembly provides a movable linkage in the form of an adjustable-length telescoping connector. The actuators 130 alternatively may comprise electric motors, pressure-operated rotational drives, and so on as the power supply, and other kinds of movable linkage to provide the desired controlled movement. For example, an electric motor may be provided to drive a screw that engages a corresponding nut to provide an alternative telescoping linkage. The actuator may be bidirectional (able to forcibly move the wing section 116 both up and down), or unidirectional (only able to lift the wing section 116 while lowering is achieved by gravity, or only able to lower the wing section 116 by pushing down against an upwards bias of a spring). A unidirectional actuator may, for example, be a motor and spool to selectively retract a cable to provide an upwards-only driving force to lift the wing section 116, or a single-acting hydraulic piston that is pressurized to apply a force to lift the wing section 116, and depressurized to allow gravity to drop the wing section 116. The actuators 130 also may include any suitable drive mechanisms to convert a motive force to the desired type of motion, such as gears, drive shafts, worm screws, and so on. These and other such actuators are known in the art, and need not be described in more detail herein.

Each wing section 116 also includes one or more ground supports 132 that extend downwards to contact the underlying ground. The ground supports 132 may comprise wheels 134, skids, combined wheel/skid assemblies, or the like, which may be attached to the wing section 116 by any suitable moving mechanism. In the example of FIG. 1, the ground supports 132 include trailing arm links 136 that pivotally connect at a proximal end to the wing section frame, and at a distal end to the axle of the wheel 134. Other linkages may be used in other embodiments. For example, a ground support 132 may comprise a wheel or skid that is attached at the end of a telescoping hydraulic piston, or a wheel or skid that is attached to a four-bar linkage. Other alternatives and variations will be apparent to persons of ordinary skill in the art in view of the present disclosure.

Each ground support 132 also has a resilient support 138 that is operatively connected to the wing section 116 and to the ground support 132. The resilient support 138 is configured to generate an adjustable predetermined force to bias the ground support in the downwards direction (i.e., towards the ground). Any device having the capability to generate a controllable adjustable force may be used as the resilient support 138. The resilient support 138 may be operatively connected as a separate part that controls the position of the ground support's 132 moving mechanism. For example, where the ground support wheel is attached on a trailing arm link 136, the resilient support 138 may be pivotally connected at one end to the link 136 and at another end to the header frame. Alternatively, the resilient support 138 may be integrated directly into the ground support's moving mechanism. For example, where a ground support wheel is attached to the end of a telescoping rod, the resilient support 138 may be integrated into the moving mechanism by forming the telescoping rod as a hydraulic or pneumatic piston and cylinder arrangement.

In FIGS. 1-3, the resilient support 138 comprises a hydraulic actuator (i.e., piston/cylinder assembly) that is separate from but attached to the ground support's moving mechanism (i.e., the link 136). The amount of downward force generated by a hydraulic actuator is a function of the working pressure of the hydraulic fluid and internal geometry of the actuator, and the geometry of the interconnected ground support 132 and resilient support 138. The correlation between the working pressure and the internal geometry of the actuator, and the output force of a hydraulic actuator, is a straightforward calculation of pressure over the operating area of the piston to determine an output force. The output force of the hydraulic actuator can then be converted to a downward force on the resilient support 138 at the point of contact with the ground by applying basic trigonometric equations. Such calculations are well within the ordinary skill in the art and need not be explained in detail here.

Figure 4:
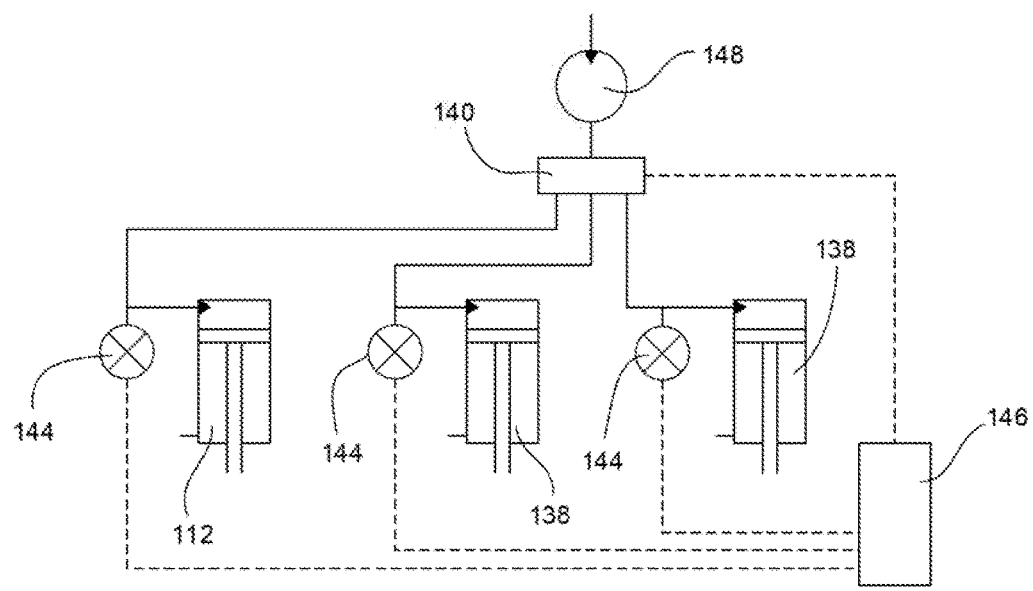
FIG. 4 is a schematic view of a control system and associated hydraulic operating equipment.

Referring to FIGS. 3 and 4, the hydraulic actuator resilient supports 138 are operated to generate a constant biasing force between the ground support 132 and the ground. This may be accomplished, for example, using a feedback pressure control loop. As shown in FIG. 3, each resilient support 138 is connected to a valve system 140 (e.g., a bank of solenoid-operated hydraulic valves) via a respective hydraulic line 142. Each hydraulic line 142 has a pressure sensor 144 to determine the operating pressure of the hydraulic fluid in each resilient support 138. The pressure values measured by the pressure sensors 144 are fed to a control system 146. The control system 146 is configured to actuate the valve system 140 to selectively adjust the pressure in each resilient support 138. This may be accomplished, for example, by selectively operating valves to either vent the hydraulic pressure in each resilient support 138 to reduce the biasing force, or operating valves to connect the resilient support 138 to a source of pressurized fluid 148 (e.g., a hydraulic pump or pressurized accumulator) to increase the biasing force. The control system 146 also may be configured to operate the feeder housing actuator 112 using another pressure sensor 144 for feedback or according to other control regimes.

An example of a control system 146 is shown in FIG. 5. The control system 146 may be implemented using any suitable arrangement of processors and logical circuits. FIG. 5 is a block diagram of exemplary hardware and computing equipment that may be used as a control system 146. The control system 146 includes a central processing unit (CPU) 500, which is responsible for performing calculations and logic operations required to execute one or more computer programs or operations. The CPU 500 is connected via a data transmission bus 502, to sensors 504 (e.g., pressure sensors 144), an input interface 506, an output interface 508, and a memory 510. The input and output interfaces 506, 508 may comprise any suitable user-operable and perceivable system, such as a touchscreen controller/display, control knobs or joysticks, and the like. One or more analog to digital conversion circuits may be provided to convert analog data from the sensors 504 to an appropriate digital signal for processing by the CPU 500, as known in the art. The CPU 500 also may be operatively connected to one or more communication ports 512, such as serial communication ports, wireless communication ports (e.g., cellular or Bluetooth communication chipsets), or the like.

The CPU 500, data transmission bus 502 and memory 510 may comprise any suitable computing device, such as an INTEL ATOM E3826 1.46 GHz Dual Core CPU or the like, being coupled to DDR3L 1066/1333 MHz SO-DIMM Socket SDRAM having a 4 GB memory capacity or other memory (e.g., compact disk, digital disk, solid state drive, flash memory, memory card, USB drive, optical disc storage, etc.). The selection of an appropriate processing system and memory is a matter of routine practice and need not be discussed in greater detail herein.

The control system 146 is programmed to maintain the pressures in the resilient supports 138 at a predetermined value that corresponds to the desired downward biasing force. Any feedback control loop may be used to accomplish this. For example, the CPU 500 may: (a) receive a user input for a desired biasing force value, (b) determine a desired operating pressure corresponding to the desired biasing force value, (c) periodically query the pressure sensors 144 to determine the actual pressure values, (d) compare the measured pressure values to the desired operating pressure values, and, if the measured values differ from the desired values by a sufficient amount, (e) issue commands to the valve system 140 via the communication ports 512 to operate the valves in a manner necessary to increase or decrease the measured pressure values.

It will be understood that it is not strictly necessary to calculate a specific downward biasing force at the point of contact between the ground support 132 and the ground. Instead, the pressure values in the hydraulic resilient supports 138 may be used as a permanent proxy for contact force values. Thus, the control system 146 may be programmed to receive user input of a desired operating pressure, and maintain the desired pressure during operation of the header 104. In other cases, the user may input a value on a unitless scalar range (e.g., 1-10), or may input a specific force measurement (e.g., 1,000 pounds), and the control system 146 can use lookup tables or perform calculations to convert the desired input into a pressure value to maintain during operation. In each case, however, the net result is that the operator enters a desired downward biasing force value (regardless of the units), and the control system 146 maintains that force value at the operators predetermined selection during operation. It will also be appreciated that the control system 146 may not (and likely cannot) maintain the desired force value with 100% accuracy at all times during operation, so some variation of the force value within normal bounds of the selected operating equipment will be experienced.

In other embodiments, the control system 146 may use alternative feedback input to modulate the pressure in the hydraulic actuator resilient supports 138. For example, FIG. 6 shows an alternative ground support 132 in the form of a skid 600 that is pivotally mounted to the wing section frame 602 by a trailing link 136 (a wheel or the like could be used in place of the skid 600). The resilient support 138 comprises a hydraulic piston/cylinder assembly pivotally connected at one end to the trailing link 136 and at the other end to the wing section frame 602. A strain gauge 604 is mounted on the trailing link 136 to measure strain in the trailing link 136. The strain gauge 604 is electrically connected to the control system 146 via a communication line 606. In this case, the control system 146 periodically queries the strain gauge 604 and evaluates the strain gauge output to determine a degree of force being generated between the skid 600 and the ground. This determination can be made based on known geometric properties of the parts, empirical testing, and so on. As before, it is also not strictly necessary to calculate a force, per se. For example, the control system 146 may be programmed to receive a user selection of a unitless scalar biasing force value (e.g., 1-10), and use this to maintain the output of the strain gauge 604 at a resistance value that corresponds to the desired biasing force value. Other alternatives and variations will be apparent to persons of ordinary skill in the art in view of the present disclosure.

As noted above, other embodiments may use other kinds of mechanisms as the resilient support. For example, the hydraulic piston and cylinder mechanisms described above may be replaced by pneumatically-operated piston and cylinder mechanisms. As another example, the hydraulic or pneumatic piston and cylinder mechanisms may be replaced by deformable spacers, such as gas- or fluid-filled bags or the like.

FIG. 7 shows another embodiment of a ground support 132 and resilient support 138. Here, the ground support 132 has a gauge wheel 134 (which may be replaced by a skid or the like), which is mounted to the wing section frame 602 by a trailing link 136. The resilient support 138 comprises a mechanical spring, such as a coil spring. The spring is pivotally mounted at one end to the trailing link 136 and at the other end to the wing section frame 602. The spring may include height adjustment collars or the like (not shown) or the like to adjust the vertical position of the wheel 134 relative to the wing section frame 602, as known in the art of suspension springs. The spring-type resilient support 138 may have an adjustable effective spring rate to allow an operator to configure the ground support 132 to provide a desired biasing force in the downwards direction.

In the shown example, the end of the spring resilient support 138 is mounted to the wing section frame 602 at a slot 700. The slot 700 extends away from the trailing link frame pivot 702, and allows the spring resilient support 138 to be repositioned to change its geometry with respect to the trailing link 136. In this example, positioning the spring resilient support 138 at the end of the slot 700 closest to the trailing link frame pivot 702 reduces the effective spring rate of the spring by increasing the mechanical advantage of forces applied vertically on the wheel 134. Moving the spring resilient support 138 towards the other end of the slot 700 decreases the mechanical advantage of such forces, and thereby increases the effective spring rate.

In other cases, the downward biasing force generated by the spring resilient support 138 may be changed by replacing the spring with a different spring having different geometric properties, adding spring collars or bushings that change the spring rate of the spring, and so on. Other alternatives and variations will be apparent to persons of ordinary skill in the art in view of the present disclosure.

It may be necessary in some cases to manually adjust the effective spring rate of a mechanical spring-type resilient support 138. However, where a movable support is used, such as in FIG. 7, the spring rate may be altered remotely be providing an actuator to move the mounting position. Such control may be manual or via a control system, such as described above. Feedback for an automated control system may be provided by strain gauges on the trailing links 136 or other suitable sensors.

Also, as with the previous embodiments, it is not strictly necessary for control or selection of the mechanical spring rate to be based on actual force generation values. Unitless scalar values or other systems that correlate changes to the system with desired force values may be used.

It will be appreciated in all of the foregoing examples, that the trailing link 136 may be oriented at a non-zero angle relative to the forward direction F, and may even be perpendicular to or oriented towards the forward direction F. Such variations may be desirable to minimize the fore-aft dimension of the header 104 or to provide other benefits or conveniences.

It is expected that the embodiments may provide various benefits over known header support systems, and particularly those that use gauge wheels on a center section rather than on the wing sections. For example, the wing section ground support 132 can be operated based on a desired force output to help suspend the wing sections 116 over the underlying ground. This is expected to provide a direct and reliable height control over undulating terrain, by operating independently of (or in addition to) height sensor feedback systems and height control systems that rely solely on wing section actuators 130 that connect the wing sections 116 to the center section 114. The ground supports 132 may be located anywhere on the wing sections 116, but more preferably are located at a point where mechanical advantage is more advantageous, such as at the middle of the wing section 116. Furthermore, multiple ground supports 132 may be provided on each wing section 116. Other alternatives and variations will be apparent to persons of ordinary skill in the art in view of the present disclosure.

Embodiments may be provided in various forms. In one instance, an embodiment may comprise an entire vehicle and header assembly, and the control system may be integrated into the header or into the vehicle. In another instance, an embodiment may comprise a segmented header and an associated control system. In another instance, an embodiment may comprise a single header wing section and an associated control system. Other configurations may be used in other embodiments.

The present disclosure describes a number of inventive features and/or combinations of features that may be used alone or in combination with each other or in combination with other technologies. The embodiments described herein are all exemplary, and are not intended to limit the scope of the claims. It will also be appreciated that the inventions described herein can be modified and adapted in various ways, and all such modifications and adaptations are intended to be included in the scope of this disclosure and the appended claims.

The invention claimed is:

1. A header for an agricultural vehicle, the header comprising:
 a feeder housing having a proximal end movably mounted on a chassis of the agricultural vehicle, a distal end located in a forward direction from the proximal end, and an actuator operatively connected to the feeder housing and chassis and configured to operate as a feeder housing position control mechanism;
 a center section extending in a lateral direction mounted to the distal end of the feeder housing;
 a wing section movably connected at a lateral end of the center section and extending in the lateral direction from the center section;
 a ground support attached to and extending in a downward direction from the wing section; and
 a resilient support operatively connected to the wing section and the ground support and configured to generate an adjustable predetermined force to bias the ground support in the downward direction.

2. The header of claim 1, wherein the ground support comprises a gauge wheel.

3. The header of claim 1, wherein the ground support comprises a skid.

4. The header of claim 1, wherein the resilient support comprises a spring.

5. The header of claim 4, wherein the spring has an adjustable effective spring rate.

6. The header of claim 1, wherein the resilient support comprises a hydraulic actuator.

7. The header of claim 6, further comprising a controller operatively connected to the hydraulic actuator and configured to maintain a pressure within the hydraulic actuator corresponding to the adjustable predetermined force.

8. The header of claim 1, wherein the resilient support comprises a pneumatic actuator.

9. The header of claim 8, further comprising a controller operatively connected to the pneumatic actuator and configured to maintain a pressure within the pneumatic actuator corresponding to the adjustable predetermined force.

10. The header of claim 1, wherein the center section and wing section are movably connected by an articulated joint, and the articulated joint comprises an actuator configured to operate as a wing section position control mechanism to control the position of the wing section relative to the center section and the feeder housing.

11. An agricultural vehicle comprising:
a chassis;
a feeder housing having a proximal end movably mounted on the chassis and a distal end located in a forward direction from the proximal end and an actuator operatively connected to the feeder housing and chassis and configured to operate as a feeder housing position control mechanism; and
a header mounted on the distal end of the feeder housing, the header comprising:
a center section mounted to the distal end of the feeder housing and extending in a lateral direction that is perpendicular to the forward direction,
a first wing section movably connected at a first lateral end of the center section and extending in the lateral direction from the center section,
a first ground support attached to and extending in a downward direction from the first wing section,
a first resilient support operatively connected to the first wing section and the first ground support and configured to generate a first adjustable predetermined force to bias the first ground support in the downward direction,
a second wing section movably connected at a second lateral end of the center section and extending in the lateral direction from the center section,
a second ground support attached to and extending in a downward direction from the second wing section,
a second resilient support operatively connected to the second wing section and the second ground support and configured to generate a second adjustable predetermined force to bias the second ground support in the downward direction.

12. The agricultural vehicle of claim 11, wherein the first ground support comprises a first gauge wheel, and the second ground support comprises a second gauge wheel.

13. The agricultural vehicle of claim 11, wherein the first ground support comprises a first skid, and the second ground support comprises a second skid.

14. The agricultural vehicle of claim 11, wherein the first resilient support comprises a first spring and the second resilient support comprises a second spring.

15. The agricultural vehicle of claim 14, wherein the first spring and the second spring each has a respective adjustable effective spring rate.

16. The agricultural vehicle of claim 11, wherein the first resilient support comprises a first hydraulic actuator, and the second resilient support comprises a second hydraulic actuator.

17. The agricultural vehicle of claim 16, further comprising a controller operatively connected to the first hydraulic actuator and the second hydraulic actuator and configured to maintain a first pressure within the first hydraulic actuator corresponding to the first adjustable predetermined force, and a second pressure within the second hydraulic actuator corresponding to the second adjustable predetermined force.

18. The agricultural vehicle of claim 11, wherein the first resilient support comprises a first pneumatic actuator, and the second resilient support comprises a second pneumatic actuator.

19. The agricultural vehicle of claim 18, further comprising a controller operatively connected to the first pneumatic actuator and the second pneumatic actuator and configured to maintain a first pressure within the first pneumatic actuator corresponding to the first adjustable predetermined force, and a second pressure within the second pneumatic actuator corresponding to the second adjustable predetermined force.

20. The agricultural vehicle of claim 11, wherein the center section and wing section are movably connected by an articulated joint, and the articulated joint comprises an actuator configured to operate as a wing section position control mechanism to control the position of the wing section relative to the center section and feeder housing.

* * * * *